(12) United States Patent
Asher

(10) Patent No.: US 7,162,772 B2
(45) Date of Patent: Jan. 16, 2007

(54) BRACKET FOR TEMPORARILY ATTACHING WHEELS AND/OR CASTERS TO OBJECTS AT A VARIETY OF ANGLES

(76) Inventor: Samuel Mordechai Asher, 1347 Golden Ave., Eugene, OR (US) 97404-2875

( * ) Notice: Subject to any disclaimer, the term of this patent is extended or adjusted under 35 U.S.C. 154(b) by 35 days.

(21) Appl. No.: 10/883,397

(22) Filed: Jun. 30, 2004

(65) Prior Publication Data

US 2006/0000055 A1 Jan. 5, 2006

(51) Int. Cl.
*B60B 33/00* (2006.01)
(52) U.S. Cl. .................. 16/29; 16/40; 16/45; 16/30
(58) Field of Classification Search .................. 16/19, 16/29, 40, 18 A, 91, 45, 30; 280/47.27, 654, 280/767, 79.11
See application file for complete search history.

(56) References Cited

U.S. PATENT DOCUMENTS

| 102,253 A | 4/1870 | Grosse |
| 133,856 A * | 12/1872 | Havell .......................... 16/40 |
| 171,981 A | 1/1876 | Brinton |
| 1,532,064 A | 3/1925 | Neiswender |
| RE16,133 E | 8/1925 | Smithfield |
| 4,187,578 A * | 2/1980 | Little .......................... 16/29 |
| 4,719,663 A | 1/1988 | Termini |
| 5,426,817 A * | 6/1995 | Rekuc .......................... 16/29 |
| 5,457,849 A * | 10/1995 | Branson et al. ................. 16/19 |
| 6,092,620 A * | 7/2000 | Klim .......................... 181/151 |
| 6,450,515 B1 | 9/2002 | Guth |
| 6,592,133 B1 | 7/2003 | Powell |
| 6,592,134 B1 | 7/2003 | Abraham |
| 6,826,800 B1 * | 12/2004 | Kao .......................... 16/31 R |
| 2003/0019705 A1 * | 1/2003 | Lau .......................... 190/18 A |

* cited by examiner

*Primary Examiner*—Robert J. Sandy
*Assistant Examiner*—Michael J. Kyle

(57) ABSTRACT

A bracket for temporarily attaching wheels and/or casters to objects at a variety of angles includes a horizontal member for supporting an object on an upper surface and for mounting a wheel or caster on a lower surface; and an attached substantially vertical side member for supporting an object along an inner surface wherein joint between said horizontal member and said substantially vertical side member is formed at an angle conforming to object to which bracket attaches and wherein said substantially vertical side member includes a vertical surface on its outer surface for accepting a wheel axle.

5 Claims, 5 Drawing Sheets

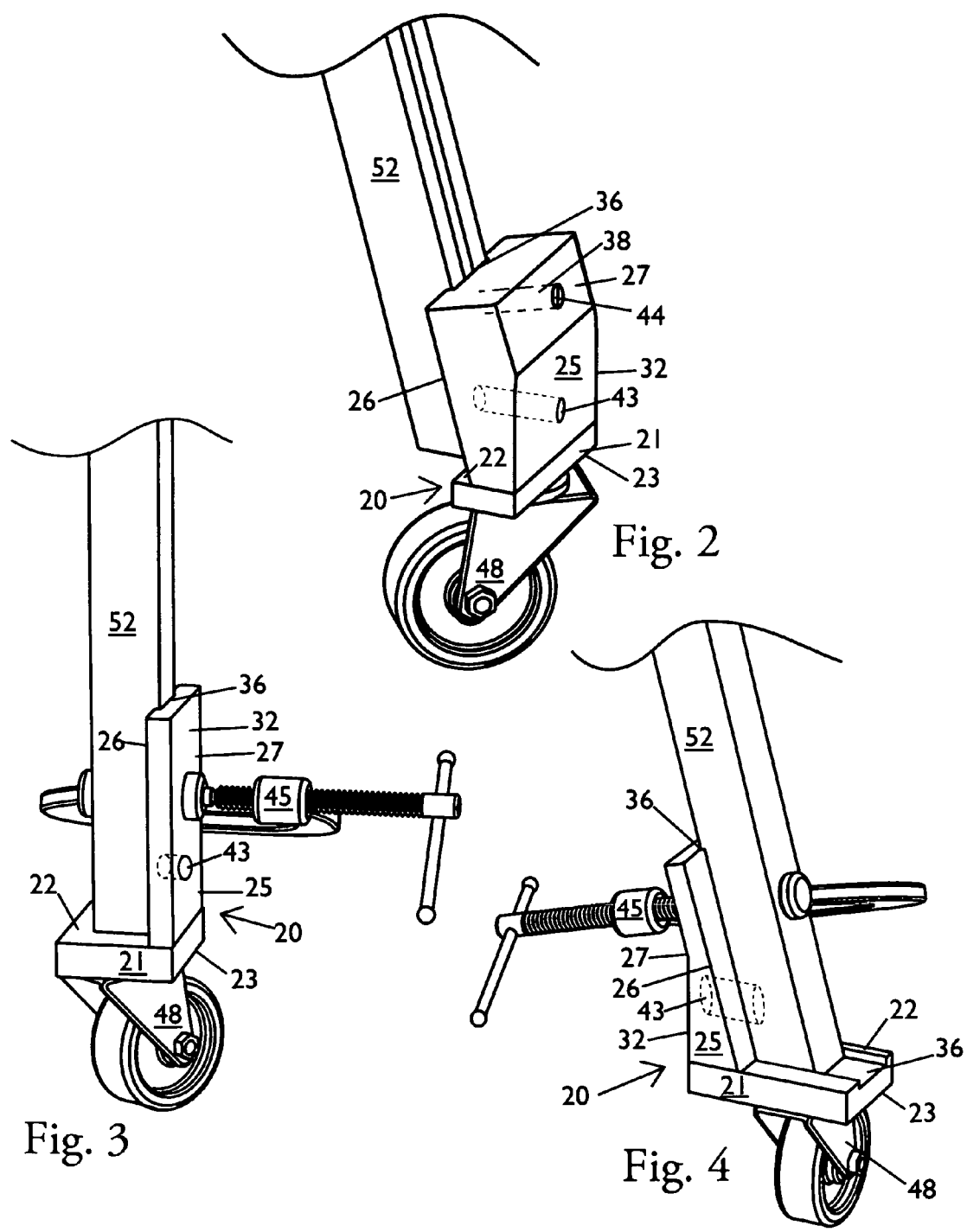

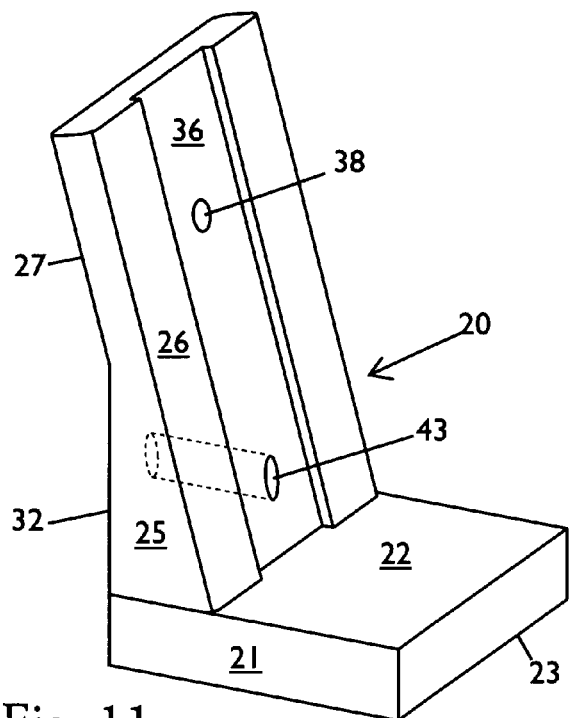
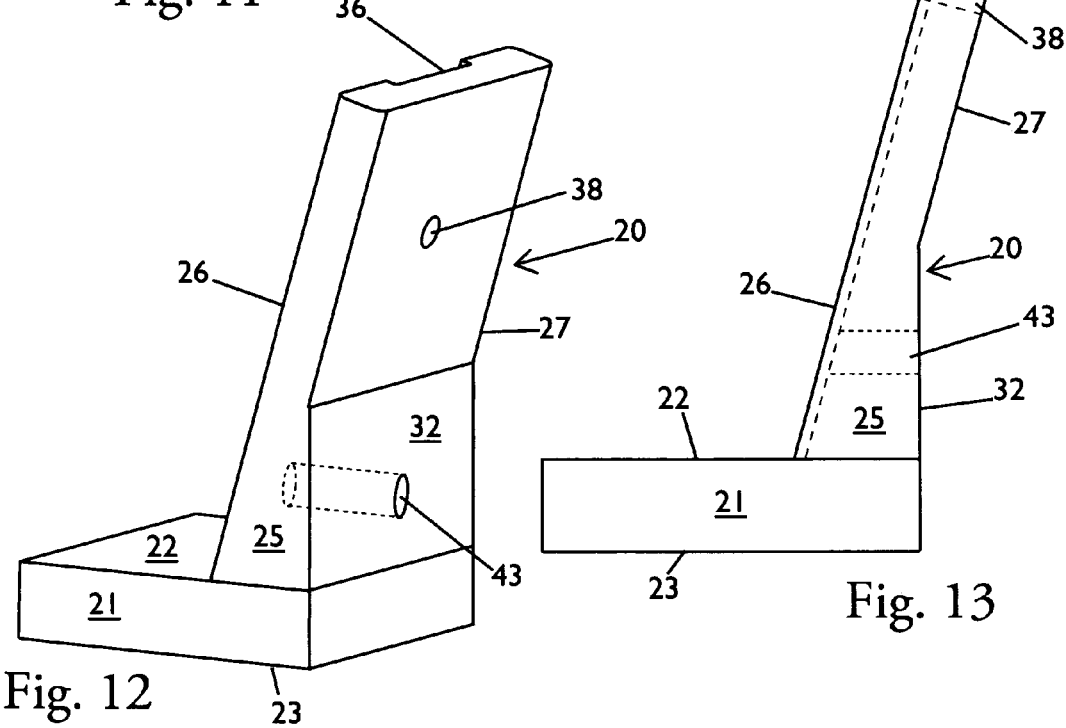
Fig. 11
Fig. 12
Fig. 13

BRACKET FOR TEMPORARILY ATTACHING WHEELS AND/OR CASTERS TO OBJECTS AT A VARIETY OF ANGLES

FIELD OF THE INVENTION

The present invention relates to brackets and, more particularly, to brackets for temporarily attaching wheels and/or casters to objects at a variety of angles.

BACKGROUND OF THE INVENTION

A number of other brackets exist which attach to various items and to which casters or wheels may attach. While such known brackets are suitable for their intended purposes, they have certain shortcomings that are addressed by the bracket of the invention.

What differentiates the present invention from those that precede it is that the brackets of the present invention may either be attached temporarily to an item, giving that item the benefit of occasional mobility, or they may be temporarily or permanently attached to some in a class of items and not attached to others in that same class of items.

Furniture dollies and/or hand trucks also provide means to make hard-to-move objects temporarily mobile, but it may be easy for those objects to fall off the furniture dollies or hand trucks. The present invention addresses this problem by temporarily and physically attaching to the hard-to-move object. In this manner the safety issues inherent to such situations are dramatically improved.

U.S. Pat. No. Re. 16,133 granted Aug. 11, 1925 to Smithfield describes a caster bracket socket that incorporates means whereby a caster socket may be secured to a member not adapted to receive customary caster sockets.

U.S. Pat. No. 102,253 granted Apr. 26, 1870 to Grosse describes an improvement in casters that incorporates flanged caster-plates providing a complete fit against a corresponding surface on the inside of angular or rectilinear-footed furniture.

U.S. Pat. No. 171,981 granted Jan. 11, 1876 to Brinton describes an improvement in furniture-casters that incorporates a caster body having vertical and horizontal parts which fit against corresponding vertical and horizontal surfaces and which fastens to a side surface.

U.S. Pat. No. 1,532,064 granted Mar. 31, 1925 to Neiswender describes an adjustable attaching frame for furniture casters that incorporates an adjustable U-shaped attaching frame.

U.S. Pat. No. 6,592,134 granted Jul. 15, 2003 to Abraham describes a ladder transport system that incorporates a method and apparatus for removably affixing a wheel assembly to the end and edge of a ladder leg.

U.S. Pat. No. 6,450,515 granted Sep. 17, 2002 to Guth describes clip-on wheels for structures with runners that incorporate removably attachable wheel assemblies.

U.S. Pat. No. 4,719,663 granted Jan. 19, 1988 to Termini describes a detachable caster wheel assembly that incorporates a slotted mounting bracket which receives a flanged caster plate assembly.

U.S. Pat. No. 6,592,133 granted Jul. 15, 2003 to Powell describes removably attachable wheel assembly for article transporting containers that incorporates adhesively attached plastic bases for snap-on rolling wheels.

Smithfield Re. 16,133 and Grosse U.S. Pat. No. 102,253 and Brinton U.S. Pat. No. 171,981 all describe variations of typical brackets for casters which are neither adjustable nor temporary. Neiswender U.S. Pat. No. 1,532,064 describes a bracket which is adjustable but permanent. Abraham U.S. Pat. No. 6,592,134 and Guth U.S. Pat. No. 6,450,515 both describe brackets which are adjustable and temporary but not variable in either the angle by which they may be attached or the range of objects to which they may be attached. Termini U.S. Pat. No. 4,719,663 describes a bracket which is removable but not adjustable. Powell U.S. Pat. No. 6,592,133 describes a bracket which is removable but specific to one type of object (luggage).

SUMMARY OF THE INVENTION

A bracket for temporarily attaching wheels and/or casters to objects at a variety of angles includes a horizontal member for supporting an object on an upper surface and for mounting a wheel or caster on a lower surface; and an attached substantially vertical side member for supporting an object along an inner surface wherein joint between said horizontal member and said substantially vertical side member is formed at an angle conforming to object to which bracket attaches and wherein said substantially vertical side member includes a vertical surface on its outer surface for accepting a wheel axle.

An object of the invention is to provide a means by which rigid wheels or casters or swivel casters may easily and safely be attached either temporarily or permanently to a wide variety of items.

Another object of the invention is to provide a means by which rigid wheels or casters or swivel casters may be attached to objects at a variety of angles as best suit the requirements of any given situation in which they might be used.

A further object of the invention to provide a means by which wheels and/or rigid or swivel casters may be mounted to either the side or bottom of an object in order to provide the user with maximum flexibility of use.

Still another object of the invention is to provide a means by which rigid wheels or casters or swivel casters may be attached in any of the ways specified above without altering the items to which they are attached in any permanent manner.

These and other objects and advantages of the invention will become more fully apparent as the description which follows is read in conjunction with the drawings.

BRIEF DESCRIPTION OF THE DRAWINGS

FIG. 2 is a situ view of a bracket formed at an acute angle affixed to an object and with a caster attached to a bracket.

FIG. 3 is a situ view of a bracket formed at a right angle clamped to an object and with a caster attached to a bracket.

FIG. 4 is a situ view of a bracket formed at an obtuse angle clamped to an object and with a caster attached to a bracket.

FIG. 11 is a perspective view of a bracket formed at an obtuse angle and illustrating recess on inner surface viewed from inner side.

FIG. 12 is a perspective view of a bracket formed at an obtuse angle viewed from outer side.

FIG. 13 is a side view of a bracket formed at an obtuse angle.

DETAILED DESCRIPTION OF THE PREFERRED EMBODIMENT

Figure 1:
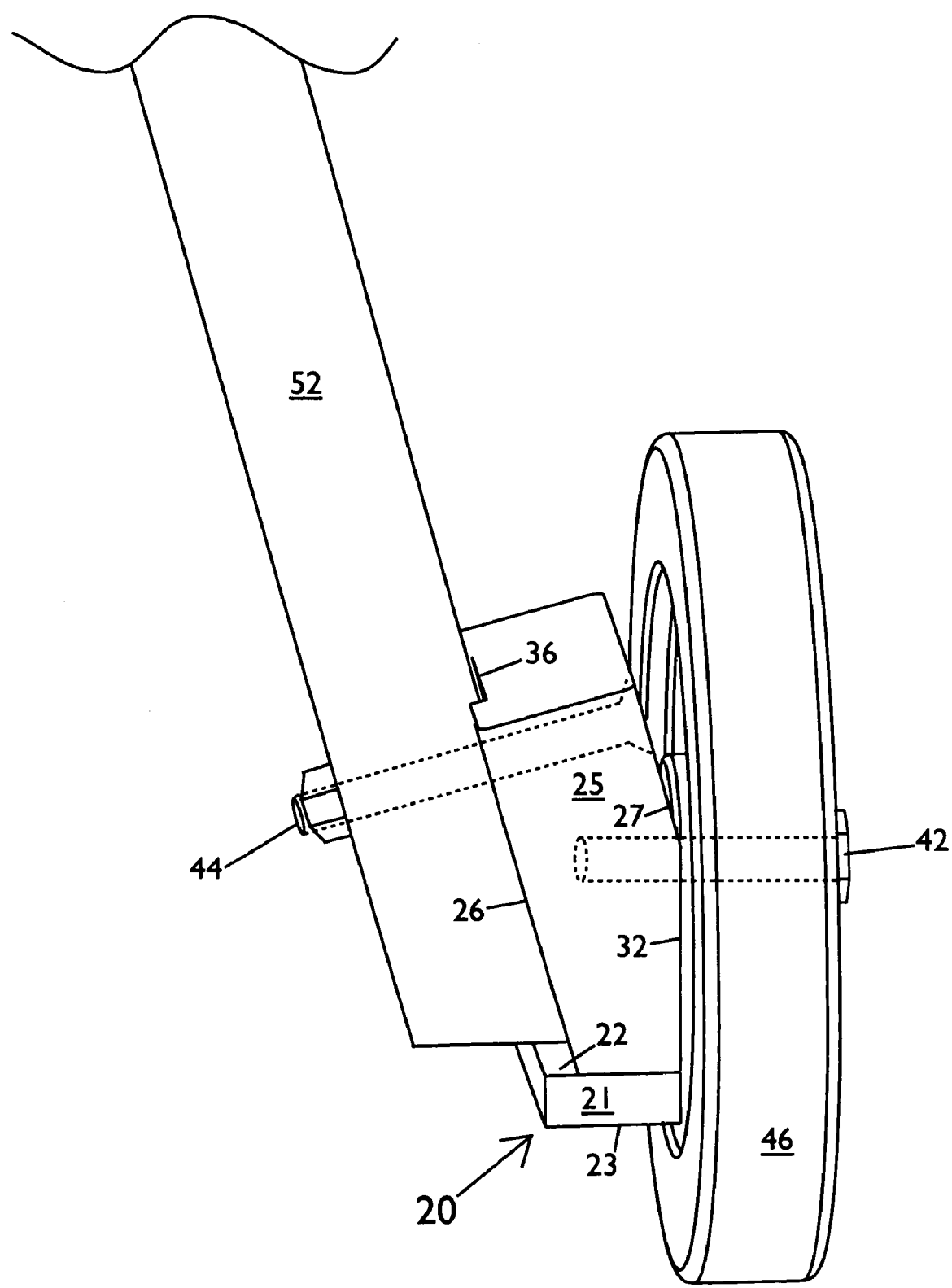
FIG. 1 is a situ view of a bracket formed at an acute angle affixed to an object and with a wheel attached to a bracket.
Figure 5:
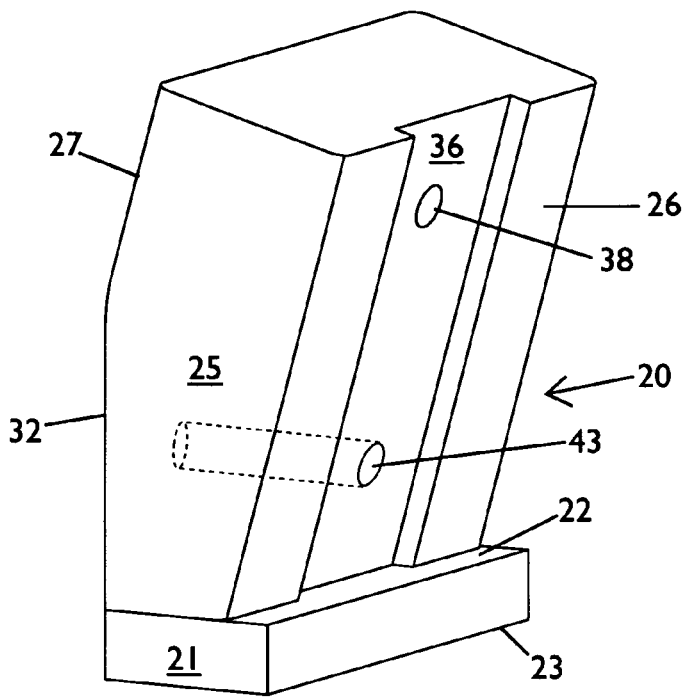
FIG. 5 is a perspective view of a bracket formed at an acute angle and illustrating recess on inner side viewed from inner side.
Figure 6:
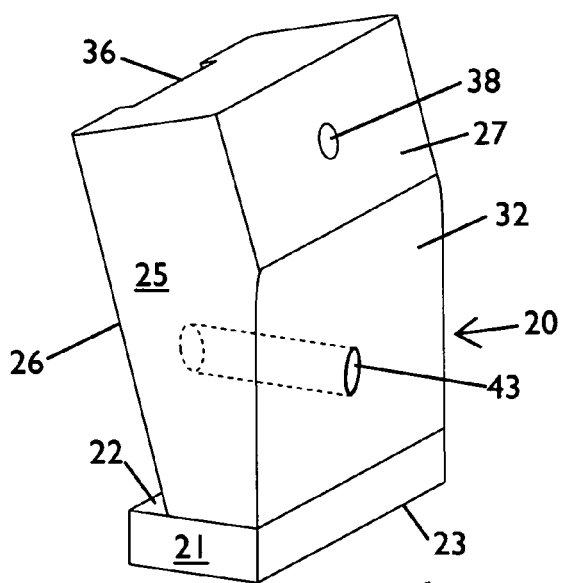
FIG. 6 is a perspective view of a bracket formed at an acute angle and illustrating vertical surface viewed from outer side.
Figure 7:
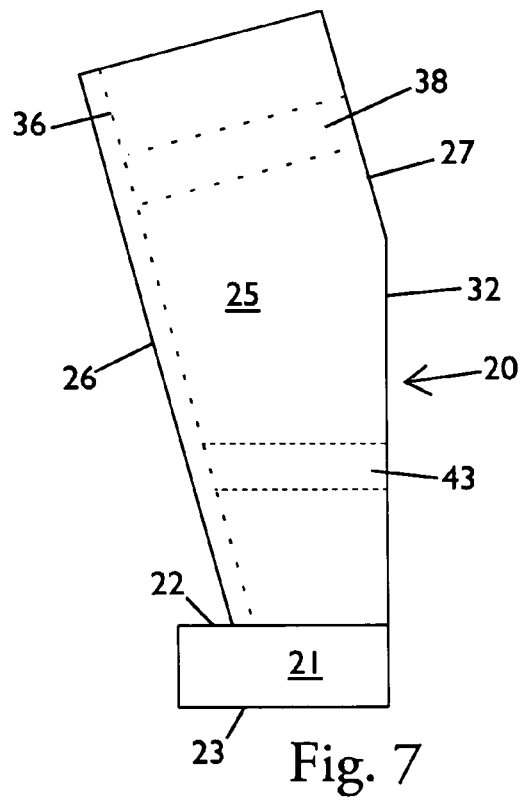
FIG. 7 is a side view of a bracket formed at an acute angle.
Figure 8:
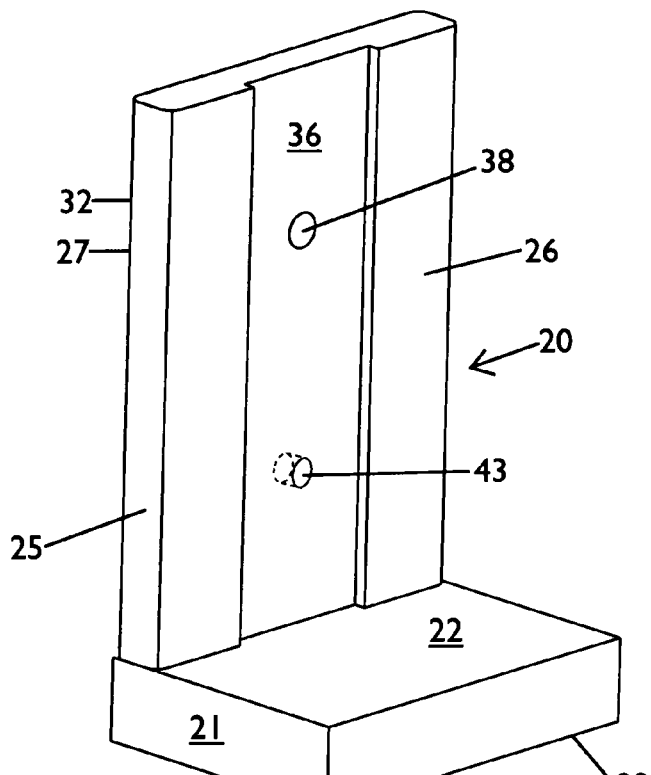
FIG. 8 is a perspective view of a bracket formed at a right angle viewed from inner side.
Figure 9:
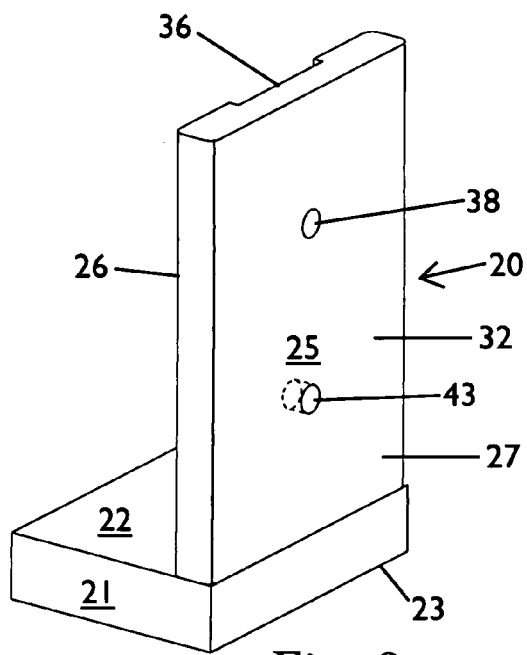
FIG. 9 is a perspective view of a bracket formed at a right angle viewed from outer side.
Figure 10:
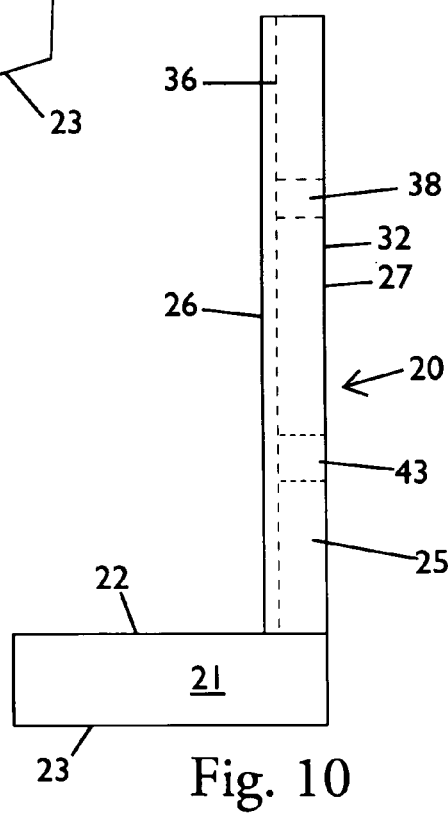
FIG. 10 is a side view of a bracket formed at a right angle.

Turning initially to FIGS. 1, 2, 3 and 4, a bracket constructed according to the invention is depicted generally at 20. As previously noted, the bracket of the invention is easily attachable and removable and easily accommodates a variety of objects.

A bracket 20 includes a base element 21 and a side element 25. Base element 21 and side element 25 may be fastened together by suitable fasteners, such as screws, or base element 21 and side element 25 may be held together by adhesive, or base element 21 and side element 25 may be fabricated of one continuous piece. Material of fabrication may be wood, metal, plastic, composite, any combination of aforementioned materials or the like. The angle where base element 21 and side element 25 meet may be acute, right or obtuse. The side element 25 may have one or more recesses 36 formed in its inner side 26 to facilitate attachment to an object 52. The size and shape of said recesses 36 may be determined by the size and shape of the object 52 to which the bracket 20 is attached. The base element 21 may have one or more recesses 36 formed in its upper side 22 to facilitate attachment to an object 52. The size and shape of said recesses 36 may be determined by the size and shape of the object 52 to which the bracket 20 is attached. Side element 25 may have one or more holes 38 or slots formed in it to facilitate attachment of bracket 20 to an object 52 using fasteners 44. Base element 21 may have one or more holes 38 or slots formed in it to facilitate attachment of bracket 20 to an object 52 using fasteners 44. Bracket 20 may be attached to object 52 using clamps 45 or other attachment means. In this way each bracket 20 is so fabricated to facilitate its attachment to and removal from a particular object 52 for which it may be specifically intended.

Wheels 46 or casters 48 may be attached to the bracket 20 to either the base element 21, the side element 25 or both as appropriate for the conditions under which bracket 20 may be utilized.

Where wheels 46 may be attached to the side element 25 the outer side 27 of the side element 25 may include a vertical surface 32 sufficient to accept an axle 42 into axle hole 43.

Thus a bracket which is easily attachable and removable, variable in the angle where base element and side element meet, and capable of accepting wheels or casters onto either base element or side element or both has been disclosed. It is further capable of being manufactured economically and sold to a user at a reasonable price. Although a preferred embodiment of the bracket of the invention has been disclosed, it will be appreciated that further modifications and variations may be made thereof without departing from the scope of the invention as defined in the appended claims.

I claim:

1. An assembly comprising a bracket, a wheel, and a caster, said bracket comprising;
   a horizontal member for supporting an object on an upper surface thereof and for mounting a wheel or caster on a lower surface thereof; and
   an attached substantially vertical side member for supporting the object along an inner surface thereof wherein a joint between said horizontal member and said substantially vertical side member is formed at any one of an obtuse, right or acute angle which may conform to various objects to which said assembly attaches and wherein said substantially vertical side member include a vertical surface on its outer surface having a horizontal tubular axle hole for accepting a horizontal wheel axle wherein said horizontal tubular axle hole is perpendicular to said vertical surface and is generally centered along the vertical axis of said vertical surface and located at a height less than the radius of at least one attached wheel from the bottom outer horizontal edge of the vertical side member; and
   said wheel having said horizontal wheel axle attaching in said horizontal tubular axle hole; and
   said caster having a mounting surface attaching to the lower surface of said horizontal member; and
   wherein either only said wheel or only said caster is attached in any given instance.

2. The assembly of claim 1 wherein said substantially vertical side member is shaped to conform to an object.

3. The assembly of claim 1 wherein said horizontal member is shaped to conform to an object.

4. The assembly of claim 1 wherein said substantially vertical side member includes one or more apertures adaptable for use with various attachment means.

5. The assembly of claim 1 wherein said horizontal member includes one or more apertures adaptable for use with various attachment means.

* * * * *